“United States Patent Office” — 2,972,610 — Patented Feb. 21, 1961

1

2,972,610

9α-HALO-21-ALDO-STEROIDS OF THE PREGNANE SERIES

Josef Fried and Josef E. Herz, New Brunswick, N.J., assignors to Olin Mathieson Chemical Corporation, New York, N.Y., a corporation of Virginia No Drawing. Filed Jan. 20, 1955, Ser. No. 483,166

12 Claims. (Cl. 260—239.55)

This invention relates to the synthesis of valuable steroids.

One of the objects of this invention is the provision of an advantageous process of preparing steroids of the pregnane (including the pregnene and allopregnane) series having a 21-aldo or acetalized or diesterified aldo group, a 9α-halo group, and an 11β-hydroxy or 11-keto group.

Another object of this invention is the provision of steroids of the pregnane (including the pregnene and allopregnane) series having a 17α-hydroxy group, a 21-aldo- or acetalized or diesterified aldo group, a 9α-halo group, and an 11β-hydroxy or 11-keto group, which compounds are useful either for their own physiological action or as intermediates in the preparation of physiological-active derivatives.

Still another object of this invention is the provision of steroids of the pregnane (including pregnene and allopregnane) series having an 18-aldo group, a 21-aldo or acetalized or diesterified aldo group, a 9α-halo group, and an 11β-hydroxy or 11-keto group.

A further object of this invention is the provision of steroids of the pregnane (including pregnene and allopregnane) series having a 17α-hydroxy group, a 21-aldo or acetalized or diesterified aldo group, and a 9β,11β-oxido group, which compounds are useful intermediates in the preparation of physiological active derivatives.

Yet another object of this invention is the provision of novel intermediates useful in the preparation of the 21-aldo or acetalized or diesterified aldo steroids of this invention.

The 9α-halo compounds of this invention comprise: (a) the steroids of the pregnane (including the pregnene and allopregnane) series having a 17α-hydroxy substituent, a 21-aldo or acetalized or diesterified aldo substituent, a 9α-halo substituent, and an 11β-hydroxy or 11-keto substituent; and (b) the steroids of the pregnane (including pregnene and allopregnane) series, unsubstituted in the 17-position, and having a 9α-halo substituent, an 11β-hydroxy or 11-keto substituent, and 18-aldo substituent, and a 21-aldo or acetalized or diesterified aldo substituent. These new steroids are prepared by one of the processes of this invention, which essentially comprises converting a 9α-halo, 11β-hydroxy or 11-keto, 21-hydroxy steroid of the pregnane (including pregnene and allopregnane) series to the corresponding 21-desoxy-21-quaternary ammonium salt, thence to a 21-desoxy-21-nitrone derivative, then converting the nitrone to either the 21-aldehyde derivative or 21-acetal derivative by reaction with an acid or an acid in alcohol, respectively, and then optionally converting the 21-aldehyde derivative to either a 21-acetal derivative or a 21-diester derivative. [The diesters of aldehydes referred to herein are, of course, diesters of the hydrate form of the aldehydes, such reference being conventional.]

Among the compounds of this invention which have a 9α-halo and a 21-aldo group are: (a) those of the general formula

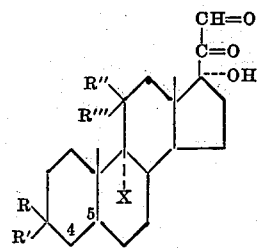

and (b) those of the general formula

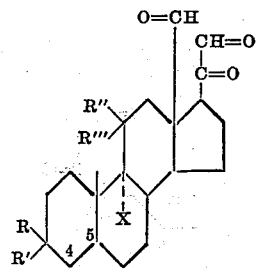

wherein the 4,5 position is double-bonded or saturated (preferably double-bonded), and wherein R is hydrogen, R' is hydroxy or together R and R' is a keto or ketalized keto group (preferably the free keto group), R" is hydrogen, R''' is β-hydroxy, or together R" and R''' is a keto group, and X is an α-halogen group. [Since, in the presence of a hydroxy-containing solvent (e.g. water), the 21-aldo group readily adds a mole of the solvent, and, therefore, exists as a hydrate (or equivalent), the terms 21-aldo and 21-aldehyde are hereby defined as including such derivatives as the hydrate, but not as including the acetal derivatives, which are referred to as acetalized aldo or aldehyde, or the diester derivatives, which are referred to as diesterified aldo or aldehyde.]

Representative 21-aldo steroids of this invention include: 9α-fluoro-Δ⁴-pregnene-11β,17α-diol-3,20-dione-21-al; 9α-chloro-Δ⁴-pregnene-11β,17α-diol-3,20-dione-21-al; 9α-bromo-Δ⁴-pregnene-11β,17α-diol-3,20-dione-21-al; 9α-iodo-Δ⁴-pregnene-11β,17α-diol-3,20-dione-21-al; 9α-fluoro-Δ⁴-pregnene-17α-ol-3,11,20-trione-21-al; 9α-chloro-Δ⁴-pregnene-17α-ol-3,11,20-trione-21-al; 9α-bromo-Δ⁴-pregnene-17α-ol-3,11,20-trione-21-al; 9α-iodo-Δ⁴-pregnene-17α-ol-3,11,20-trione-21-al; 9α-fluoro-Δ⁴-pregnene-11β-ol-3,20-dione-18,21-dial; 9α-chloro-Δ⁴-pregnene-11β-ol-3,20-dione-18,21-dial; 9α-bromo-Δ⁴-pregnene-11β-ol-3,20-dione-18,21-dial; and 9α-iodo-Δ⁴-pregnene-11β-ol-3,20-dione-18,21-dial.

Among the compounds of this invention which have a 9α-halo and a 21-acetal group are: (a) those of the general formula

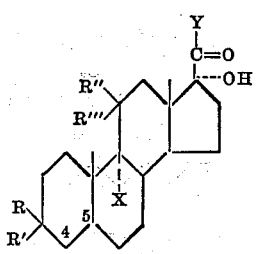

wherein the 4,5 position is double-bonded or saturated (preferably double-bonded), and wherein R, R', R", R''' ' and X are as above-defined, and Y is either of the acetalized aldo groups

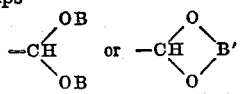

wherein B is a saturated aliphatic radical, such as an alkyl (e.g. a lower alkyl, such as methyl, ethyl, propyl, n-butyl or amyl), a haloalkyl (e.g. a halo-substituted lower alkyl, such as chloromethyl, 2-fluoroethyl, 2-bromopropyl, or 1-2-dichloroethyl), or an alkoxyalkyl (e.g. a lower alkoxyalkyl, such as ethoxymethyl, methoxyethyl, or ethoxyethyl); or B is an aralkyl radical such as a phenylalkyl (e.g. benzyl, phenethyl, tolyethyl, p-chlorobenzyl, or anisylmethyl), or a naphthylalkyl (e.g. naphthylmethyl); and B' is a saturated aliphatic divalent radical such an alkylene (e.g. a lower alkylene, such as ethylene, propylene, 2-methylpropylene, or butylene), a haloalkylene (e.g. a halo-substituted lower alkylene, such as chloroethylene, fluoropropylene, or 1-chloro-2-ethylpropylene), or an alkoxyalkylene (e.g. a lower alkoxy-lower-alkylene, such as ethoxyethylene, 2-methoxypropylene, or methoxyethylene); and (b) those of the general formula

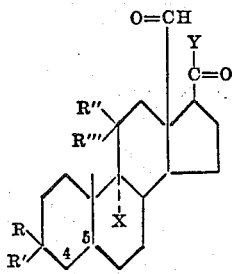

wherein the 4,5 position is double-bonded or saturated, and wherein R, R', R", R''' X, and Y are as above-defined. [The preferred compounds (b) are those wherein the 4,5-position is double-bonded, R and R' together represent oxo, R" is hydrogen, and R''' is β-hydroxy.]

Representative 9α-halo, acetalized 21-aldo steroids of this invention include the acetals (both straight chain and cyclic) of the hereinbefore-named specific aldehydes.

Among the compounds of this invention which have a 9α-halo and a 21-diester group are (a) those of the general formula

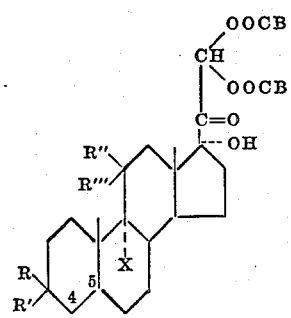

wherein the 4,5 position is double-bonded or saturated (preferably double-bonded), and wherein R, R', R", R''', X, and B are as above-defined, and (b) those of the general formula

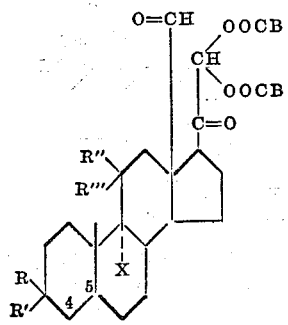

wherein the 4,5 position is double-bonded or saturated, and wherein R, R', R", R''', X, and B are as above-defined. [The preferred compounds (b) are those wherein R and R' together represent oxo, R" is hydrogen, and R''' is β-hydroxy.]

Representative 9α-halo diesterified 21-aldo steroids of this invention including the diesters of the hereinbefore-named specific aldehydes. The particularly preferred compounds are those wherein B is a lower alkyl radical (e.g. the diacetates).

According to one of the processes of this invention, a steroid of the pregnane (including pregnane and allopregnane) series having a 21-hydroxy group, a 9α-halo group, and an 11β-hydroxy or 11-keto group is reacted with an aromatic sulfonyl halide (e.g. an aromatic sulfonyl chloride or sulfonyl bromide) in the presence of a tertiary base. The product initially formed will depend upon the temperature of the reaction. At a low temperature in the range of about −10° C. to about +15° C. (preferably about 10° C. to 15° C.), the 21-hydroxy group is initially replaced by the halide moiety of the sulfonyl halide, yielding the corresponding steroid of the pregnane series having a 21-halo group (e.g. chloro or bromo), a 9α-halo group, and an 11β-hydroxy or 11-keto group. However, if the temperature of the reaction is elevated to the range of about 40° C. to about 100° C. (preferably about 80° C. to 100° C.), or the initial reaction is carried out at low temperature and the 21-halo formed is reacted with excess tertiary base at the elevated temperature, a quaternary ammonium salt of the 21-halo steroid and the tertiary base is formed as the principal product.

Among the compounds which are suitable as initial reactants in the foregoing process are those of the general formula

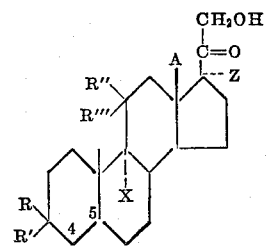

wherein the 4, 5-position is double-bonded or saturated, A is methyl or formyl, Z is hydrogen or α-hydroxy, and R, R', R", R''', and X are as hereinbefore-defined. The preferred compounds are those wherein the 4, 5-position is double-bonded, R and R' together represent oxo, R" is hydrogen, R''' is β-hydroxy, or together R" and R''' is oxo, A is methyl, and Z is hydrogen or α-hydroxy.

Representative starting materials include: the 9α-halohydrocortisones (e.g. 9α-fluorohydrocortisone and 9α-chlorohydrocortisone); the 9α-halocortisones (e.g. 9α-fluorocortisone and 9α-chlorocortisone); the 9α-halocorticosterones (e.g. 9α-fluorocorticosterone and 9α-chlorocorticosterone); the 9α-halo-dehydrocorticosterones (e.g. 9α-fluorodehydrocorticosterone and 9α-chlorodehydrocorticosterone); and the 9α-haloaldosterones (e.g. 9α-fluoroaldosterone and 9α-chloroaldosterone).

As before stated, these starting materials are treated with an aromatic sulfonyl halide, as exemplified by p-toluene sulfonyl chloride and p-toluene sulfonyl bromide, in the presence of a tertiary base, such as pyridine, a lutidine, or a collidine [although other tertiary organic bases such as tri (lower alkyl) amines may also be used] either in the cold or at elevated temperatures. If the reaction is conducted at a low temperature, then a 21-halo steroid is formed. These compounds are exemplified by those of the following general formula

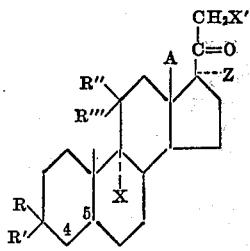

wherein the 4, 5-position is doubled-bonded or saturated (preferably double-bonded), X' is chloro or bromo (preferably chloro), and R, R', R", R''', A, Z and X are as above-defined.

Representative compounds include: the 9α,21-dihalo-(wherein the 21-halo is limited to either chloro or bromo)-Δ⁴-pregnene-11β,17α-diol-3,20-diones [disclosed in our U.S. application Serial No. 434,672, filed June 4, 1954, now U.S. Patent No. 2,263,671]; the 9α-halo-21-chloro-Δ⁴-pregnene-17α-ol-3,11,20-triones; the 9α-halo-21-bromo-Δ⁴-pregnene-17α-ol-3,11,20-triones; the 9α-halo-21-chloro-Δ⁴-pregnene-11β-ol-3,20-diones; the 9α-halo-21-bromo-Δ⁴-pregnene-11β-ol-3,20-diones; the 9α-halo-21-chloro-Δ⁴-pregnene-3,11,20-triones; the 9α-halo-21-bromo-Δ⁴-pregnene-3,11,20-triones; the 9α-halo-21-chloro-Δ⁴-pregnene-11β-ol-3,20-dione-18-als; and the 9α-halo-21-bromo-Δ⁴-pregnene-11β-ol-3,20-dione-18-als.

If the starting materials, or the 21-halo derivatives thereof (which may be formed by conducting the reaction at a low temperature) are reacted with the tertiary base at elevated temperature, a 21-quaternary ammonium halide (wherein the halide is bromide or chloride) is formed. These quaternary ammonium salts are exemplified by those of the following general formula

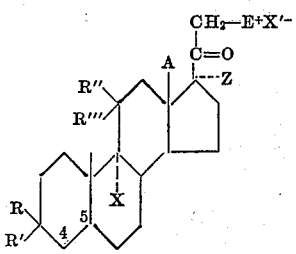

wherein the 4, 5-position is double-bonded or saturated (preferably double-bonded), E is a tertiary amine, and R, R', R", R''', A, Z, X, and X' are as hereinbefore-defined.

In the next step of the process of this invention, the quaternary ammonium halide is reacted with a nitroso compound, preferably an aromatic nitroso compound, such as nitroso benzene and p-nitroso-dimethylaniline, in the presence of a basic reagent such as potassium bicarbonate. By this procedure, a 21-nitrone is formed. These nitrones are exemplified by those of the following general formula

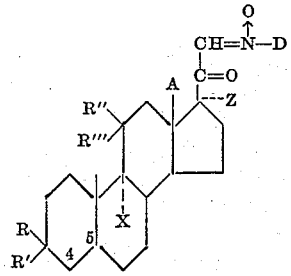

wherein the 4, 5-position is double-bonded or saturated (preferably double-bonded), R, R', R", R''', A, Z, and X are as hereinbefore defined, and D is an aromatic radical such as phenyl and p-dimethylamino phenyl.

To convert the 21-nitrones to an acetal derivative of a 21-aldehyde, the former is then reacted, according to the process of this invention, under anhydrous conditions in an acidic medium with either a monohydric alcohol of the formula BOH or a dihydric alcohol of the formula B'(OH)₂, wherein B and B' are as above-defined, preferably with an alcohol of the formula BOH, wherein B is a lower alkyl (e.g., methyl, ethyl, n-propyl, or n-butyl) or benzyl radical. The reaction is preferably carried out by dissolving or suspending the starting material in an anhydrous organic solvent, such as chloroform, acetone, dioxane, etc., and treating the solution with a mineral acid such as hydrogen chloride or a strong organic acid, such as trichloroacetic acid or p-toluene sulfonic acid, dissolved in the alcohol reactant. The ratio of alcohol to steroid for the reaction is preferably at least two equivalents of alcohol (i.e. two moles of an-alcohol BOH or one mole of an alcohol B'(OH)₂) per mole of steroid. If the alcohol reactant is a lower alcohol, the nitrone can be suspended directly in the mineral acid-alcohol solution, thereby eliminating the organic solvent. The reaction proceeds readily at room temperature, but may be conducted at any temperature in the range of about 25° C. to about 100° C.

The acetal derivative formed by this step of the process of this invention may then be converted to the corresponding free aldehyde by reacting the acetal with an aqueous mineral acid, such as hydrochloric acid or perchloric acid, in mixture with an organic solvent, such as acetic acid, dioxane, acetone, etc., preferably at room temperature.

The free aldehydes can also be prepared directly from the nitrones by reacting the latter with the aforementioned mineral acids or strong organic acids, in an inert organic solvent such as acetone, acetic acid, dioxane, etc., preferably at room temperature. These free aldehydes can then in turn be converted to either the acetalized derivatives by treatment with an alcohol, such as those of the formula BOH and B'(OH)₂, under acidic conditions, or the diesterified derivatives by treatment, in an organic base (e.g. pyridine), with an anhydride, such as those of the formula

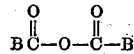

wherein B is as hereinbefore-defined, as exemplified by acetic anhydride.

A modification of the process of this invention consists of the direct oxidation of an acetal derivative of a 21-aldo steroid having an 11β-hydroxy group to the corresponding acetal derivative having an 11-keto group. Thus, to form a 21-aldo steroid having an 11-keto group, instead of starting with the corresponding steroid having an 11-keto group and converting this 11-keto steroid to acetal derivative and thence to the free aldehyde, the 11β-hydroxy derivative (R" is hydrogen, R''' is β-hydroxy) is chosen as the initial reactant, and this reactant is converted to the 21-acetal derivative. The acetal derivative is then reacted with a customary oxidizing agent, such as chromic oxide in a basic medium such as pyridine, to oxidize the 11β-hydroxy group to keto, and the 11-keto 21-acetal derivative thus formed is then converted to the free 21-aldehyde.

For the purpose of illustrating one process of this invention, reference is made to the following schematic analysis employing 9α-halo-hydrocortisone and 9α-halo-cortisone as starting materials:

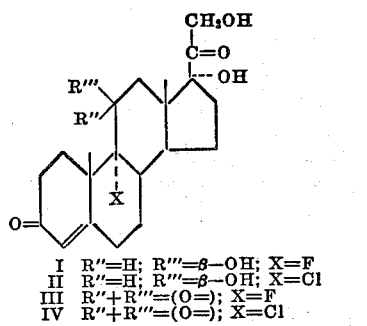

I  R″=H; R‴=β—OH; X=F
II  R″=H; R‴=β—OH; X=Cl
III  R″+R‴=(O=); X=F
IV  R″+R‴=(O=); X=Cl

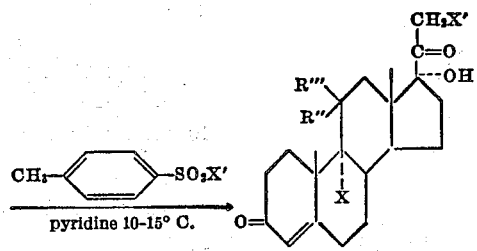

V  R″=H; R‴=β—OH; X=F; X′=Cl
VI  R″=H; R‴=β—OH; X=F; X′=Br
VII  R″=H; R‴=β—OH; X=Cl; X′=Cl
VIII  R″=H; R‴=β—OH; X=Cl; X′=Br
IX  R″+R‴=(O=); X=F; X′=Cl
X  R″+R‴=(O=); X=F; X′=Br
XI  R″+R‴=(O=); X=Cl; X′=Cl
XII  R″+R‴=(O=); X=Cl; X′=Br tosyl X′
pyridine
80–100° C.

pyridine
80–100° C.

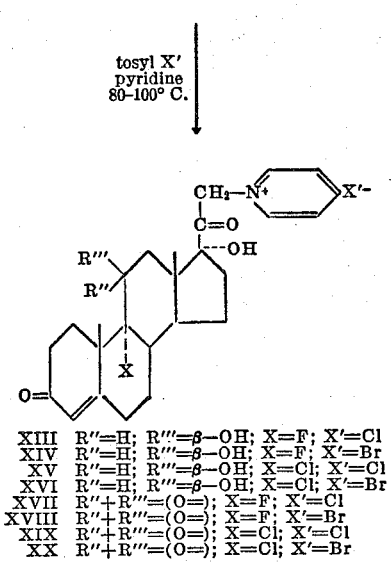

XIII  R″=H; R‴=β—OH; X=F; X′=Cl
XIV  R″=H; R‴=β—OH; X=F; X′=Br
XV  R″=H; R‴=β—OH; X=Cl; X′=Cl
XVI  R″=H; R‴=β—OH; X=Cl; X′=Br
XVII  R″+R‴=(O=); X=F; X′=Cl
XVIII  R″+R‴=(O=); X=F; X′=Br
XIX  R″+R‴=(O=); X=Cl; X′=Cl
XX  R″+R‴=(O=); X=Cl; X′=Br p-nitroso-dimethyl aniline
KHCO₃

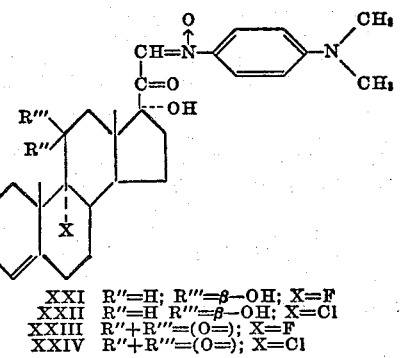

XXI  R″=H; R‴=β—OH; X=F
XXII  R″=H R‴=β—OH; X=Cl
XXIII  R″+R‴=(O=); X=F
XXIV  R″+R‴=(O=); X=Cl

H⁺ (aqueous acetone)

H⁺
BOH

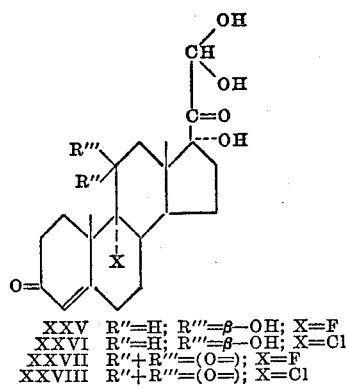

XXV  R″=H; R‴=β—OH; X=F
XXVI  R″=H; R‴=β—OH; X=Cl
XXVII  R″+R‴=(O=); X=F
XXVIII  R″+R‴=(O=); X=Cl

H⁺
BOH
⇌
H⁺
(acetone)

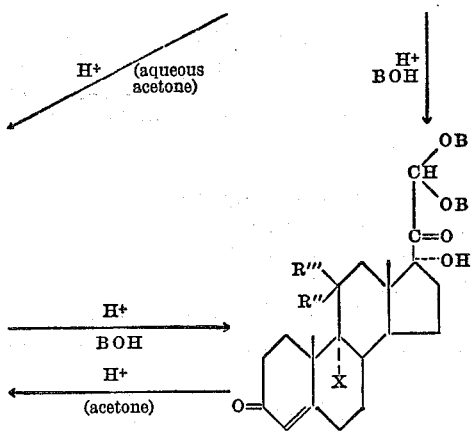

XXIX  R″=H; R‴=β—OH; X=F; B=CH₃
XXX  R″=H; R‴=β—OH; X=Cl; B=CH₃
XXXI  R″+R‴=(O=); X=F; B=CH₃
XXXII  R″+R‴=(O=); X=Cl; B=CH₃

The acetal derivatives, the diester derivatives, and the free aldehydes of this invention are active materials which possess glucocorticoid as well as mineralocorticoid activity. Thus, the new steroids of this invention can be administered instead of, and in the same manner as, cortisone or hydrocortisone in the treatment of rheumatoid arthritis and dermatomyositis, and desoxycorticosterone in the treatment of Addison's disease or adrenal insufficiencies. The dosage for such administration is of course dependent on the relative activity; thus, where the acetal derivative, for example, has activity of the same order as hydrocortisone, for example, the dosage is of the same order.

The following examples are illustrative of the invention (all temperatures being in centigrade):

EXAMPLE 1

9α-fluoro- Δ⁴-pregnene-11β,17α-diol-3,20-dione 21-pyridinium chloride (XIII) and 9α-fluoro,21-chloro- Δ⁴-pregnene-11β,17α-diol-3,20-dione (V) from 9α-fluorohydrocortisone (I)

A solution of 500 mg. of 9α-fluorohydrocortisone and 300 mg. of pure p-toluene sulfonyl chloride in 3.5 ml. of anhydrous pyridine is warmed in the steam bath for 15 minutes. After standing at room temperature for 2 hours, 10 ml. of acetone is added and the mixture placed in the refrigerator for 4 hours. The resulting crystals are filtered off and washed with acetone. Recrystallization of this fraction (about 228 mg.) from methanol furnishes the pure 21-pyridinium chloride, M.P. about 320–321° (dec.); $[\alpha]_D^{23} + 200°$ (c. 0.22 in methanol);

$\lambda_{max.}^{alc.}$ 239 m$\mu$ (E=19,600)

Analysis.—Calcd. for $C_{26}H_{33}O_4NClF$ (447.99): C, 65.33; H, 6.96; Cl, 7.42. Found: C, 65.48; H, 6.82; Cl, 7.37.

Concentration of the pyridine-acetone mother liquor in vacuo to a thick sirup and addition of acetone gives after cooling an additional crop (about 21 mg.) of the pyridium chloride. For the preparation of the nitrone the two crops are used without further purification.

Concentration of the mother liquors to near dryness in vacuo affords after addition of acetone and cooling about 180 mg. of 9$\alpha$-fluoro-21-chloro-$\Delta^4$-pregnene-11$\beta$-17$\alpha$-diol-3,20-dione, M.P. about 265° (dec.), which after crystallization from methanol melts at about 275° (dec.); $[\alpha]_D^{23} + 153°$ (c. 0.3 dioxane);

$\lambda_{max.}^{alc.}$ 238 m$\mu$ (E=16,800); $\lambda_{max.}^{Nujol}$ 2.88$\mu$, 3.04$\mu$ (OH), 5.83$\mu$ (20-keto); 6.08 (3-keto)

Analysis.—Calcd. for $C_{21}H_{28}O_4ClF$ (398.89): C, 63.23; H, 7.08; Cl, 8.89. Found: C, 63.25; H, 7.34; Cl, 8.44.

When the above reaction is conducted at 5–15° 9$\alpha$-fluoro-21-chloro-$\Delta^4$-pregnene-11$\beta$,17$\alpha$-diol-3,20-dione is formed exclusively.

If p-toluene sulfonyl bromide is substituted for p-toluene sulfonyl chloride in Example 1, the resulting mixture will consist of the 21-pyridinium bromide (XIV) and the 21-bromide (VI). Furthermore, if 9$\alpha$-fluorocortisone (III) is substituted for 9$\alpha$-fluorohydrocortisone, then the resulting steroids will be either a mixture of 9$\alpha$-fluoro-$\Delta^4$-pregnene-17$\alpha$-ol-3,11,20-trione 21-pyridinium chloride (XVII) and 9$\alpha$-fluoro-21-chloro-$\Delta^4$-pregnene-17$\alpha$-ol-3,11,20-trione (IX), or 9$\alpha$-fluoro-$\Delta^4$-pregnene-17$\alpha$-ol-3,11,20-trione 21-pyridinium bromide (XVIII) and 9$\alpha$-fluoro-21-bromo-$\Delta^4$-pregnene-17$\alpha$-ol-3,11,20-trione (X), depending on whether tosyl chloride (in the preparation of the first mixture) or tosyl bromide (in the preparation of the second mixture) is used.

The process of Example 1 is of general applicability and may also be employed to convert 17-unsubstituted steroids having a 21-hydroxy group to the corresponding 21-aldo substituted derivatives. Thus, if a 9$\alpha$-halocorticosterone or 9$\alpha$-halo-dehydrocorticosterone is substituted for 9$\alpha$-fluoro-hydrocortisone in Example 1, the corresponding 21-desoxycorticosterone and 21 - desoxydehydrocorticosterone derivatives are formed, respectively. Similarly if a 9$\alpha$-haloaldosterone, such as 9$\alpha$-fluoroaldosterone or 9$\alpha$-chloroaldosterone, is substituted for the 9$\alpha$-fluorohydrocortisone in the process of Example 1, the corresponding 21-desoxyaldosterone derivatives are produced.

EXAMPLE 2

9$\alpha$-chloro-$\Delta^4$-pregnene-11$\beta$,17$\alpha$-diol-3,20-dione 21-pyridinium chloride (XV) and 9$\alpha$,21-dichloro-$\Delta^4$-pregnene-11$\beta$,17$\alpha$-diol-3,20-dione (VII) from 9$\alpha$-chlorohydrocortisone (II)

A solution of 500 mg. of 9$\alpha$-chlorohydrocortisone and 300 mg. p-toluenesulfonyl chloride in 3 ml. of anhydrous pyridine is heated on the steam bath for 15 minutes. A crystalline precipitate appears which is filtered off and washed with acetone. It represents the desired 21-pyridinium chloride, M.P. about 287° (dec.) and is used with out further purification in the nitrone formation reaction. Concentration of the mother liquor afford an additional crop of this substance and then two crops of a lower melting substance, M.P. about 235–237°, which is recrystallized from 95% alcohol. The latter substance represents 9$\alpha$,21-dichloro-$\Delta^4$-pregnene-11$\beta$,17$\alpha$-diol-3,20-dione; $[\alpha]_D^{23} + 178°$ (c. 0.28 in absolute alcohol);

$\lambda_{max.}^{alc.}$ 241 m$\mu$ (E=16,000); $\lambda_{max.}^{Nujol}$ 2.87$\mu$ (11-OH, 3.01$\mu$ (17-OH), 5.83$\mu$ (20-keto), 6.08$\mu$ (3-keto)

Analysis.—Calcd. for $C_{21}H_{28}O_4Cl_2$ (415.34): C, 60.72; H, 6.79; Cl, 17.08. Found: C, 60.79; H, 6.70; Cl, 16.66.

If p-toluenesulfonyl bromide is substituted for p-toluenesulfonyl chloride in Example 2, the resulting mixture will consist of the 21-pyridinium bromide (XVI) and the 21-bromide (VIII). Furthermore, upon the substitution of 9$\alpha$-chlorocortisone (IV) for the 9$\alpha$-chloro-hydrocortisone, either a mixture of 9$\alpha$-chloro-$\Delta^4$-pregnene-17$\alpha$-ol-3,11,20-trione 21-pyridinium chloride (XIX) and 9$\alpha$,21-dichloro-$\Delta^4$-pregnene-17$\alpha$-ol-3,11,20-trione (XI), or 9$\alpha$-chloro-$\Delta^4$-pregnene-17$\alpha$-ol-3,11,20-trione 21 - pyridinium bromide (XII) and 9$\alpha$-chloro-21-bromo-$\Delta^4$-pregnene-17$\alpha$-ol-3,11,20-trione (XII), depending on whether tosyl chloride or tosyl bromide is used, will be formed.

The 21-halo steroids produced by the method of Examples 1 and 2 can then be converted to the quaternary ammonium salt as illustrated by the following example using Compound V as a starting material:

EXAMPLE 3

9$\alpha$-fluoro-$\Delta^4$-pregnene-11$\beta$,17$\alpha$-diol-3,20-dione 21-pyridinium chloride (XIII) from 9$\alpha$-fluoro-21-chloro-$\Delta^4$-pregnene-11$\beta$,17$\alpha$-diol-3,20-dione (V)

A solution of 156 mg. of 9$\alpha$-fluoro-21-chloro-$\Delta^4$-pregnene-11$\beta$,17$\alpha$-diol-3,20-dione in 3 ml. of dry pyridine is heated on the steam bath for 30 minutes and after cooling 5 ml. of acetone is added. Cooling produced a crop of crystals (about 123 mg.), M.P. about 319–321° (dec.), which represent the 21-pyridinium chloride. From the mother liquors about 32 mg. of starting material M.P. 263° (dec.) is recovered.

Since the tertiary base is eliminated in the next step of the process, the exact chemical composition of the base is of no importance, so that any other tertiary base may be substituted for pyridine in the processes of the above examples to yield other quaternary ammonium salts. Examples of such bases include the lutidines, the collidines, the tri(lower alkyl) amines (e.g. trimethylamine and triethylamine), N-alkylated piperidine, etc.

The formation of the nitrones in the next step of the process of this invention is illustrated by the following examples, using p-nitrosodimethyl aniline as a source of the nitroso reactant:

EXAMPLE 4

9$\alpha$-fluoro-$\Delta^4$-pregnene-11$\beta$,17$\alpha$-diol-3,20-dione 21-(p-dimethylaminophenyl)-nitrone (XXI) from 9$\alpha$-fluoro-$\Delta^4$-pregnene-11$\beta$,17$\alpha$-diol-3,20-dione 21-pyridinium chloride (XIII)

To a warm solution of 250 mg. (0.52 millimole) of 9$\alpha$-fluoro-$\Delta^4$-pregnene-11$\beta$,17$\alpha$-diol-3,20-dione 21-pyridinium chloride in 7 ml. of methanol and 4.5 ml. water is added 89 mg. (0.58 millimole) of p-nitrosodimethyl aniline and shortly thereafter a solution of 55 mg. of potassium bicarbonate (0.55 millimole) in 0.7 ml. of water. The mixture is gently warmed on a steam bath and then allowed to remain in the refrigerator overnight. The resulting red crystals (about 170 mg.) are filtered off, washed with 1:1 methanol-water and the mother liquors concentrated in vacuo. An additional crop (about 47 mg.) is obtained in this manner. The nitrone is used in the preparation of the aldehyde without further purification. For analysis the unstable nitrone is recrystallized from methanol, M.P. about 226° (dec.);

$\lambda_{max.}^{alc.}$ 240 m$\mu$ ($\epsilon$=25,000), 304 m$\mu$ ($\epsilon$=9,400) and 415 m$\mu$ ($\epsilon$=11,850)

Analysis.—Calcd. for $C_{29}H_{37}O_5N_2F$ (512.61): C, 67.94; H, 7.28; N, 5.57. Found: C, 68.87; H, 7.36; N, 6.28.

EXAMPLE 5

9α-chloro-Δ⁴-pregnene-11β,17α-diol-3,20-dione 21-(p-dimethylaminophenyl)-nitrone (XXII) from 9α-chloro-Δ⁴-pregnene-11β,17α-diol - 3,20 - dione 21-pyridinium chloride (XV)

To a warm suspension of 140 mg. of 9α-chloro-Δ⁴-pregnene-11β,17α-diol-3,20-dione 21-pyridinium chloride in 3.8 ml. of methanol and 2.4 ml. water is added 47 mg. of p-nitrosodimethyl aniline. When the latter has dissolved a solution of 30 mg. of potassium bicarbonate in 0.38 ml. of water is added and the mixture warmed on the steam bath until all the pyridinium salt has dissolved, and has been replaced by the red crystals of the nitrone. The reaction mixture is then cooled and allowed to remain in the refrigerator for one hour. The crystals are filtered and washed with 50% methanol-water and finally with water. The yield of nitrone is about 104 mg., M.P. about 206°. The substance is used in the preparation of the aldehyde without further purification.

In an analogous manner the pyridinium bromides (XIV and XVI) can be converted to the 9α-fluoro and 9α-chloro derivatives, respectively.

If 9α-fluoro-Δ⁴-pregnene-17α-ol-3,11,20-trione 21-pyridinium chloride (XVII) or bromide (XVIII) is substituted for the pyridinium chloride in Example 4, 9α-fluoro-Δ⁴-pregnene-17α-ol-3,11,20-trione 21 - (p-dimethylaminophenyl)-nitrone (XXIII) is formed. Similarly, if 9α-chloro-Δ⁴-pregnene-17α-ol-3,11,20-trione 21-pyridinium chloride (XIX) or bromide (XX) is substituted for the pyridinium chloride in Example 5, 9α-chloro-Δ⁴-pregnene-17α-ol-3,11,20-trione 21-(p-dimethylaminophenyl)-nitrone (XXIV) is produced. Analogously, the quaternary ammonium salts of the corticosterone, dehydrocorticosterone and aldosterone derivatives are converted to the corresponding nitrones.

Although the above examples employ p-nitrosodimethyl aniline as the source of the nitroso radical, any other aromatic nitroso-containing compound (such as nitroso benzene) may be used instead, since in the next step of the process the nitroso group is replaced by an aldo or acetalized aldo substituent.

The nitrone is then converted either to the 21-acetalized aldo or the free 21-aldo as illustrated by the following examples:

EXAMPLE 6

9α-fluoro-Δ⁴-pregnene-11β,17α-diol - 3,20-dione-21-al hydrate (XXV) from 9α-fluoro-Δ⁴-pregnene-11β,17α-diol-3,20-dione 21-(p-dimethylaminophenyl)-nitrone (XXI)

To a suspension of 120 mg. of 9α-fluoro-Δ⁴-pregnene-11β,17α - diol - 3,20 - dione(21 - p - dimethylaminophenyl)-nitrone in 2 ml. of acetone is added at room temperature 1 ml. of 2 N aqueous hydrochloric acid. Gentle agitation causes the nitrone to dissolve rapidly to form a yellow solution. After centrifugation of some insoluble matter 4 ml. of water is added, which causes the aldehyde hydrate to crystallize in fine needles. After one hour at 5° the crystals are separated from the mother liquors and washed thoroughly with water. The resulting crystals (about 81.5 mg.), after recrystallization from acetone-water melt at about 190–191°, $[\alpha]_D^{23}$ +126° (c. 0.48 in methanol);

$\lambda_{max.}^{alc.}$ 238 mμ (ε=18,300); $\lambda_{max}^{Nujol}$ 3.0–3.2μ (OH), 5.86μ (20-keto), 6.15μ (4-keto)

*Analysis.*—Calcd. for $C_{21}H_{27}O_5F \cdot H_2O$ (396.44): C, 63.62; H, 7.37; F, 4.79. Found: C, 63.71; H, 7.18; F, 4.87.

9α - fluoro - Δ⁴ - pregnene - 11β,17α - diol - 3,20-dione-21-al hydrate possesses about ⅓ the activity of cortisone acetate in the rat liver glycogen assay and is about equal in activity to desoxycorticosterone in the sodium retention assay in the rat.

To prove its 20-keto-21-aldo structure, the steroid is converted into the quinoxaline as follows:

A solution of 20 mg. of the 21-aldehyde hydrate and 8 mg. of o-phenylenediamine in 2 ml. of 95% alcohol is refluxed for one hour. On concentration and cooling about 14.6 mg. of the desired quinoxaline is obtained, which after recrystallization from 95% alcohol melts at about 308–310°;

$\lambda_{max.}^{alc.}$ 237 mμ (ε=49,900); 308 mμ (ε=7,500), 319 mμ (ε=8,700)

*Analysis.*—Calcd. for $C_{27}H_{31}N_2O_3F$ (450.54): C, 71.97; H, 6.94; N, 6.22. Found: C, 71.55; H, 7.01; N, 6.07.

Furthermore, with sodium bisulfite, the 9α-fluorohydrocortisone 21-aldehyde hydrate readily forms a bisulfite adduct.

EXAMPLE 7

9α - chloro - Δ⁴ - pregnene - 11β,17α - diol - 3,20 - dione-21-al hydrate (XXVI) from 9α-chloro-Δ⁴-pregnene-11β,17α - diol - 3,20 - dione - 21 - (p - dimethylaminophenyl)-nitrone (XXII)

9α-chloro-Δ⁴-pregnene-11β,17α-diol-3,20-dione 21-(p-dimethylaminophenyl)-nitrone is converted to 9α-chloro-Δ⁴-pregnene-11β,17α-diol-3,20-dione-21-al hydrate as described in Example 6 for the corresponding fluoro compound.

The pure 9α - chloro - Δ⁴ - pregnene-11β,17α-diol-3,20-dione-21-al hydrate, after recrystallization from dilute acetone, has the following properties: M.P. greater than 345° with darkening at 195°; $[\alpha]_D^{23}$ +132° (c. 0.35 in methanol);

$\lambda_{max.}^{alc.}$ 240 mμ (ε=18,400); $\lambda_{max.}^{Nujol}$ 2.92μ, 3.05–3.09μ (OH), 5.85μ (20-keto), 6.12μ (3-keto)

*Analysis.*—Calcd. for $C_{21}H_{27}O_5Cl \cdot H_2O$ (412.90): C, 61.08; H, 7.08; Cl, 8.59. Found: C, 61.43; H, 6.73; Cl, 8.66.

9α - chloro - Δ⁴ - pregnene - 11β,17α - diol - 3,20-dione-21-al hydrate shows about ⅓ the activity of cortisone acetate in the rat liver glycogen assay. It is about 3 times as active as desoxycorticosterone in the sodium retention assay in the rat.

The 21-aldehyde hydrate can be converted into the bisulfite adduct and the quinoxaline as described in Example 6 for the corresponding 9α-fluoro compound.

If 9α-fluoro-Δ⁴-pregnene-17α-ol-3,11,20-trione 21-(p-dimethyl aminophenyl)-nitrone (XXIII) is substituted for the 9α-fluoro-Δ⁴-pregnene-11β,17α-diol-3,20-dione 21-(p-dimethylaminophenyl)-nitrone of Example 6, or if 9α-chloro-Δ⁴-pregnene-17α-ol-3,11,20-trione 21-(p-dimethylaminophenyl)-nitrone (XXIV) is substituted for the 9α-chloro-11β-hydroxy derivative of Example 7, then 9α-fluoro - Δ⁴ - pregnene - 17α - ol - 3,11,20 - trione - 21 - al hydrate (XXVII) and 9α-chloro-Δ⁴-pregnene-17α-ol-3,11,20-trione-21-al hydrate (XXVIII) are formed, respectively. Similarly, by substituting the 21-(p-dimethylaminophenyl) - nitrone derivatives of 9α - fluoro (or chloro)-Δ⁴pregnene-11β-ol-3,20-dione, or of 9α-fluoro (or chloro)-Δ⁴-pregnene-3,11,20-trione, or of 9α-fluoro (or chloro)-Δ⁴-pregnene-11β-ol-3,20-dione-18-al for the nitrone employed in Example 6, 9α-fluoro (or chloro)-Δ⁴-pregnene-11β-ol-3,20-dione-21-al hydrate, and 9α-fluoro (or chloro)-Δ⁴-pregnene-11β-ol-3,20-dione-18,21-diol 21-hydrate, respectively, are produced.

The aldehyde hydrates produced by the methods of Examples 6 and 7 can then be converted to their acetal derivatives by treatment with the desired alcohol in the presence of an acid. This process is illustrated by the following example:

EXAMPLE 8

9α - fluoro - Δ⁴ - pregnene - 11β,17α - diol - 3,20 - dione-21-al dimethyl acetal (XXIX) from 9α-fluoro-Δ⁴-pregnene-11β,17α-diol-3,20-dione-21-al hydrate (XXV)

A solution of 100 mg. of 9α-fluoro-Δ⁴-pregnene-11β,17α-diol-3,20-dione-21-al hydrate in 10 ml. of 1% methanolic hydrogen chloride is allowed to stand at room temperature for 24 hours. An excess of sodium bicarbonate solution is then added and the solution is concentrated in vacuo. The residual mixture is extracted with chloroform, the cholorform solution washed with water and the solvent evaporated in vacuo. The resulting residue consists of the desired dimethyl acetal.

By substituting 9α-chloro-Δ⁴-pregnene-11β,17α-diol-3,20-dione-21-al hydrate (XXVI), or 9α-fluoro-Δ⁴-pregnene-17α-ol-3,11,20-trione-21 al hydrate (XXVII), or 9α-chloro-Δ⁴-pregnene-17α-ol-3,11,20-trione-21 - al hydrate (XXVIII) for the aldehyde in Example 8, the corresponding dimethyl acetals (compounds XXX to XXXII, respectively) are obtained. Similarly, the hydrates of the aldehyde derivatives of 9α-fluoro and 9α-chloro corticosterone, dehydrocorticosterone, and aldosterone, can be converted to their respective dimethyl acetal derivatives by the method of Example 8.

Furthermore, by substituting 10 ml. of 1% ethanolic hydrogen chloride for the methanolic hydrogen chloride in Example 8, 9α-fluoro-Δ⁴-pregnene-11β,17α-diol-3,20-dione-21-al-diethyl acetal is produced. Similarly, by substituting other alkanols for methanol in Example 8, the corresponding 21-dialkyl acetal derivatives are formed. Thus, n-propanol yields 9α-fluoro-Δ⁴-pregnene-11β,17-diol-ol-3,20-dione-21-al-di-n-propyl acetal, and n-butanol yields 9α-fluoro-Δ⁴-pregnene-11β,17α-diol-3,20-dione-21-al-di-n-butyl acetal, while ethylene glycol yields 9α-fluoro-Δ⁴-pregnene-11β,17α-diol-3,20-dione-21-al-ethylene acetal.

Moreover, the 21-acetals can be produced directly from the nitrones as illustrated by the following example:

EXAMPLE 9

9α-fluoro-Δ⁴-pregnene-11β,17α-diol-3,20-dione 21-al dimethyl-acetal (XXIX) from 9α-fluoro-Δ⁴-pregnene-11β, 17α - diol - 3,20 - dione - 21 - (p - dimethylaminophenyl)-nitrone (XXI)

To a suspension of 120 mg. of 9α-fluoro-Δ⁴-pregnene-11β,17α-diol-3,20-dione-21 - (p-dimethylaminophenyl)-nitrone in 2 ml. of acetone is added at room temperature 1 ml. of 2 N methanolic hydrogen chloride. The mixture is taken up in 20 ml. of chloroform and 4 ml. of water. After separation of the phases, the chloroform layer is extracted with dilute bicarbonate and water and after drying over sodium sulfate, is evaporated to dryness in vacuum. The residue represents the dimethyl acetal of 9α-fluoro-Δ⁴-pregnene-11β,18α-diol-3,20-dione-21-al.

The aldehydes can be converted to their diesterified derivatives by treatment with an acid anhydride in a tertiary base, as illustrated by the following example:

EXAMPLE 10

9α-fluoro-Δ⁴-pregnene-11β,17α-diol-3,20-dione-21-al 21-diacetate from 9α-fluoro-Δ⁴-pregnene-11β,17α-diol-3,20-dione-21-al hydrate (XXV)

A solution of 50 mg. of 9α-fluoro-Δ⁴-pregnene-11β,17α-diol-3.20-dione-21-al hydrate in 0.5 ml. of acetic anhydride and 0.5 ml. of pyridine is allowed to stand at room temperature for 18 hours. Evaporation of the reagents in vacuo leaves a residue consisting of the diacetate derivative.

In a similar manner the other 9α-halo-21-aldehyde hydrates of this invention can be converted to the diester derivatives. Furthermore, if other acid anhydrides are substituted for acetic anhydride in the above example, the corresponding diester is formed.

Although the 9α-bromo and 9α-iodo-21-aldo or acetalized or diesterified aldo steroids of this invention can be prepared by the methods of Examples 1 through 10, in some instances it may be preferable to form these halide derivatives indirectly from the corresponding 9α-chloro 11β-hydroxy 21-aldo or acetalized derivatives by way of the 9β,11β-oxido intermediates. Thus, the 9α-chloro 11β-hydroxy 21-aldo (or acetalized aldo) derivatives are reacted with a salt of a strong base and a weak acid, such as an alkali metal carbonate or bicarbonate (i.e. potassium carbonate) or an alkali metal lower alkanote (i.e. potassium acetate), and the corresponding 9β,11β-oxido compound, thus formed, is then reacted with a hydrogen halide (e.g. hydrofluoric acid, hydrochloride acid, hydrobromic acid or hydroiodic acid) to form the 9α-halo 11β,17α-dihydroxy 21-aldo (or acetalized aldo) derivative. The series of steps can be represented by the following schematic analysis and examples:

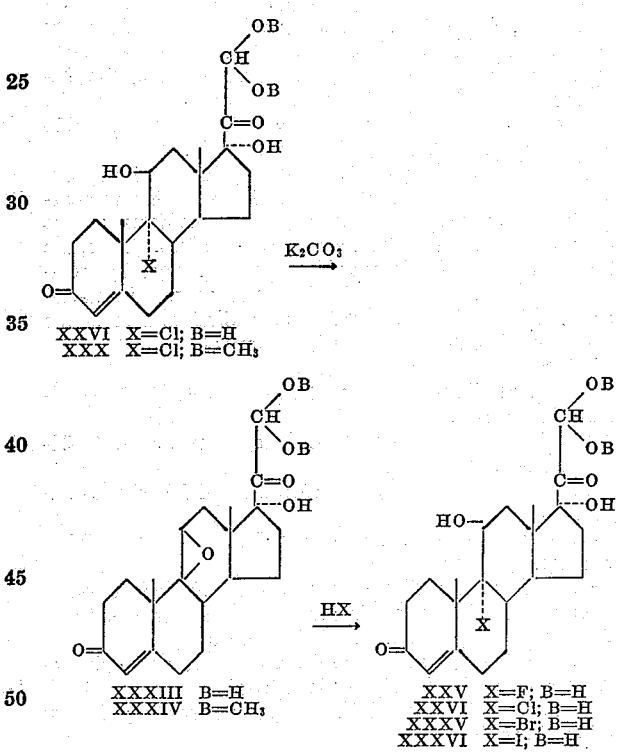

EXAMPLE 11

9β,11β-oxido-Δ⁴-pregnene-17α-ol-3,20-dione-21-al hydrate (XXXIII) from 9α-chloro-Δ⁴-pregnene-11β,17α-diol-3,20-dione-21-al hydrate (XXVI)

To a solution of 100 mg. of 9α-chloro-Δ⁴-pregnene-11β,17α-diol-3,20-dione-21-al hydrate in 10 ml. of methanol is added a solution of 100 mg. of potassium carbonate in 0.5 ml. of oxygen-free water. Nitrogen is passed through the resulting solution for 5 minutes and the mixture is allowed to remain at room temperature for three hours. Acetic acid is added to neutralize the carbonate and after the addition of 5 ml. water the methanol is removing in vacuo. The remaining aqueous suspension is extracted with chloroform, the chloroform extract washed with water and dried over sodium sulfate. Evaporation of the solvent leaves a residue of the desired 9β,11β-epoxide.

In a similar manner, by using 9α-chloro-Δ⁴-pregnene-11β,17α-diol-3,20-dione-21-al dimethylacetal (XXX) as the starting material, 9β,11β-oxido-Δ⁴-pregnene-17α-ol-3,20-dione-21-al dimethylacetal (XXXIV) is formed.

EXAMPLE 12

9α-bromo - Δ⁴ - pregnene - 11β,17α - diol-3,20 - dione 21-al (XXXV) from 9β,11β-oxido-Δ⁴-pregnene-17α-ol-3,20-dione-21-al (XXXIII)

To a solution of 25 mg. of 9β,11β-oxido-Δ⁴-pregnene-17α-ol-3,20-dione-21-al in 1 ml. of chloroform is added with shaking at room temperature 0.04 ml. 30% hydrobromic acid in glacial acetic acid. After 10 minutes, 10 ml. of chloroform is added, and the mixture is extracted with dilute sodium bicarbonate and with water. The chloroform solution is dried over sodium sulfate, and evaporated to dryness in vacuo; and the residue, representing 9α-bromo-Δ⁴-pregnene-11β,17α-diol - 3,20 - dione-21-al is crystallized from acetone.

In a similar manner, by substituting 60% aqueous hydroiodic acid for hydrobromic acid in Example 12, the corresponding 9α-iodo compound (XXXVI) is formed.

The 9α-bromo and 9α-iodo acetalized 21-aldehydes or diesterified 21-aldehydes can be prepared from the 9α-bromo and 9α-iodo 21-aldo derivatives by the methods of Examples 8 or 10, respectively, or the 9α-bromo and 9α-iodo acetalized 21-aldehydes can be prepared directly from the 9β,11β-oxido acetalized 21-aldehyde (XXXIV) by the method of Example 12. Furthermore, the 9α-bromo or 9α-iodo 11β-hydroxy 21-aldo derivatives can be oxidized to the 9α-bromo or 9α-iodo 11-keto 21-aldo derivatives by reaction with chromic acid.

These 9α-bromo and 9α-iodo 21-aldo steroids, aside from their activity as glucocorticoids and mineralocorticoids, have an added utility as intermediates in the preparation of the known 9α-dehalo analogues. Thus, the 9α-bromo and 9α-iodo steroids may be reduced by treatment with usual reducing agents, such as zinc in glacial acetic acid, to remove the 9α-halo radical and form the corresponding 9-unsubstituted derivatives.

We claim:

1. 21-acetalized 9α-chloro-Δ⁴-pregnene - 11β,17α - diol-3,20-dione-21-al.
2. 21-acetalized 9α-chloro-Δ⁴-pregnene-17α-ol-3,11,20-trione-21-al.
3. 9α-chloro-Δ⁴-pregnene-11β,17α-diol-3,20 - dione - 21-al hydrate.
4. 9α-chloro-Δ⁴-pregnene-17α-ol-3,11,20 - trione - 21-al hydrate.
5. 9β,11β-oxido-Δ⁴-pregnene-17α-ol-3,20-dione-21-al.
6. The 21-di(lower alkanoic acid) ester of 9α-chloro-Δ⁴-pregnene-11β,17α-diol-3,20-dione-21-al.
7. The 21-di(lower alkanoic acid) ester of 9α-chloro-Δ⁴-pregnene-17α-ol-3,11,20-trione-21-al.
8. A steroid selected from the group consisting of those of the formula

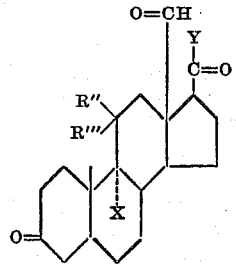

and

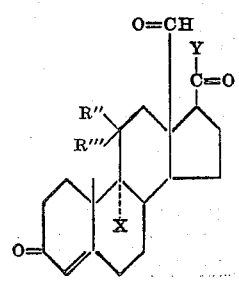

individually R″ is hydrogen, R‴ is β-hydroxy and together R″ and R‴ is keto; X is an α-halogen group; and Y is selected from the class consisting of

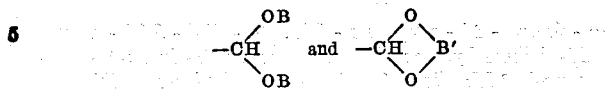

wherein B is a radical of the class consisting of saturated aliphatic and aralkyl radicals, and B′ is a saturated divalent aliphatic radical.

9. 21-acetalized 9α-halo-Δ⁴-pregnene-11β-ol-3,20-dione-18,21-dial.
10. A steroid selected from the class consisting of those of the formula

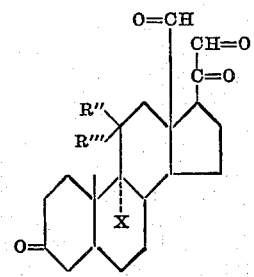

and

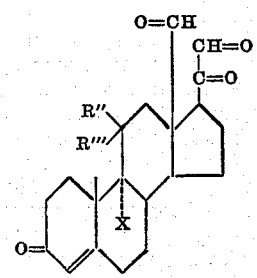

wherein individually R″ is hydrogen, R‴ is β-hydroxy and together R″ and R‴ is keto; X is an α-halogen group; and the hydrates thereof.

11. 9α-halo-Δ⁴-pregnene-11β-ol-3,20 - dione - 18,21-dial hydrate.
12. A steroid selected from the class consisting of those of the formulae

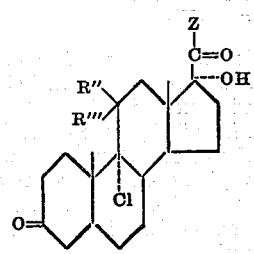

and

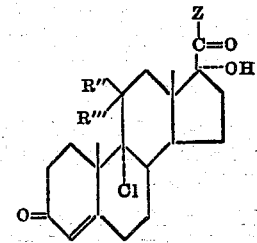

wherein individually R″ is hydrogen, R‴ is β-hydroxy and together R″ and R‴ is keto; and Z is selected from the class consisting of —CH=O, —CH(OH)₂

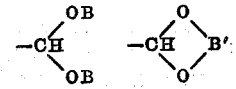

and

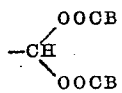

wherein B is a radical of the class consisting of saturated aliphatic and aralkyl radicals, and B' is a saturated divalent aliphatic radical.

References Cited in the file of this patent

UNITED STATES PATENTS

| | | |
|---|---|---|
| 2,708,202 | Pfister et al. | May 10, 1955 |
| 2,720,481 | Leanza et al. | Oct. 11, 1955 |
| 2,730,525 | Hogg et al. | Jan. 10, 1956 |
| 2,736,681 | Tishler | Feb. 28, 1956 |
| 2,859,212 | Fried | Nov. 4, 1958 |

FOREIGN PATENTS 716,974  Great Britain _____ Oct. 20, 1954

OTHER REFERENCES

Fried et al.: J. Am. Chem. Soc., vol. 75, 2273 (1953).
Fried et al.: J. Am. Chem. Soc. vol. 76, 1455 (1954).
Rogers et al.: J. Am. Chem. Soc., vol. 74, 2947 (1952).
Simpson et al.: Helv. Chim. Acta, vol. 37, pp. 1170, 1171 and 1197.
Hershberg et al.: J. Am. Chem. Soc., vol. 74, 3850 (1952).
Mattox: J. Am. Chem. Soc., vol. 74, pp. 4330, 4341 and 4346.
Borman et al.: Proc. Soc. Exp. Bio. Med., vol. 86, pp. 570–573.